United States Patent [19]

Metiva

[11] Patent Number: 4,954,115
[45] Date of Patent: Sep. 4, 1990

[54] GAME CALL

[76] Inventor: Dru G. Metiva, 1945 19 Mile Rd., Marion, Mich. 49665

[21] Appl. No.: 279,858

[22] Filed: Dec. 5, 1988

[51] Int. Cl.⁵ ............................................. A63H 5/00
[52] U.S. Cl. .................................................. 446/204
[58] Field of Search ............... 446/202, 204, 213, 216, 446/404, 205, 206, 26; 116/137 R

[56] References Cited

U.S. PATENT DOCUMENTS

| | | | |
|---|---|---|---|
| 497,759 | 5/1893 | Beardsley et al. | 446/204 |
| 623,728 | 4/1899 | Marsters | 446/205 X |
| 754,314 | 3/1904 | Johnson | 446/204 |
| 1,626,198 | 4/1927 | Jacquemin | 446/204 |
| 1,648,245 | 11/1927 | Rudolph | 446/206 |
| 1,658,528 | 1/1926 | Petrie | 446/26 |
| 4,709,651 | 12/1987 | Lance | 446/204 X |

FOREIGN PATENT DOCUMENTS

| | | | |
|---|---|---|---|
| 1040226 | 10/1953 | France | 446/205 |
| 112363 | 1/1918 | United Kingdom | 446/204 |
| 468821 | 7/1937 | United Kingdom | 446/205 |

Primary Examiner—Robert A. Hafer
Assistant Examiner—S. Rimell
Attorney, Agent, or Firm—Donald J. Breh

[57] ABSTRACT

A game call for simulating the cry of an owl that is effective in attracting wild turkeys at long range is disclosed. The call includes a hardwood body having a closed cylindrical chamber and a passage through a wall of the body angled at 45 degrees relative to the longitudinal axis of the chamber in a direction toward a flow of air directed across the inlet to the passage wherein the passage has a square outlet into the closed chamber.

10 Claims, 1 Drawing Sheet

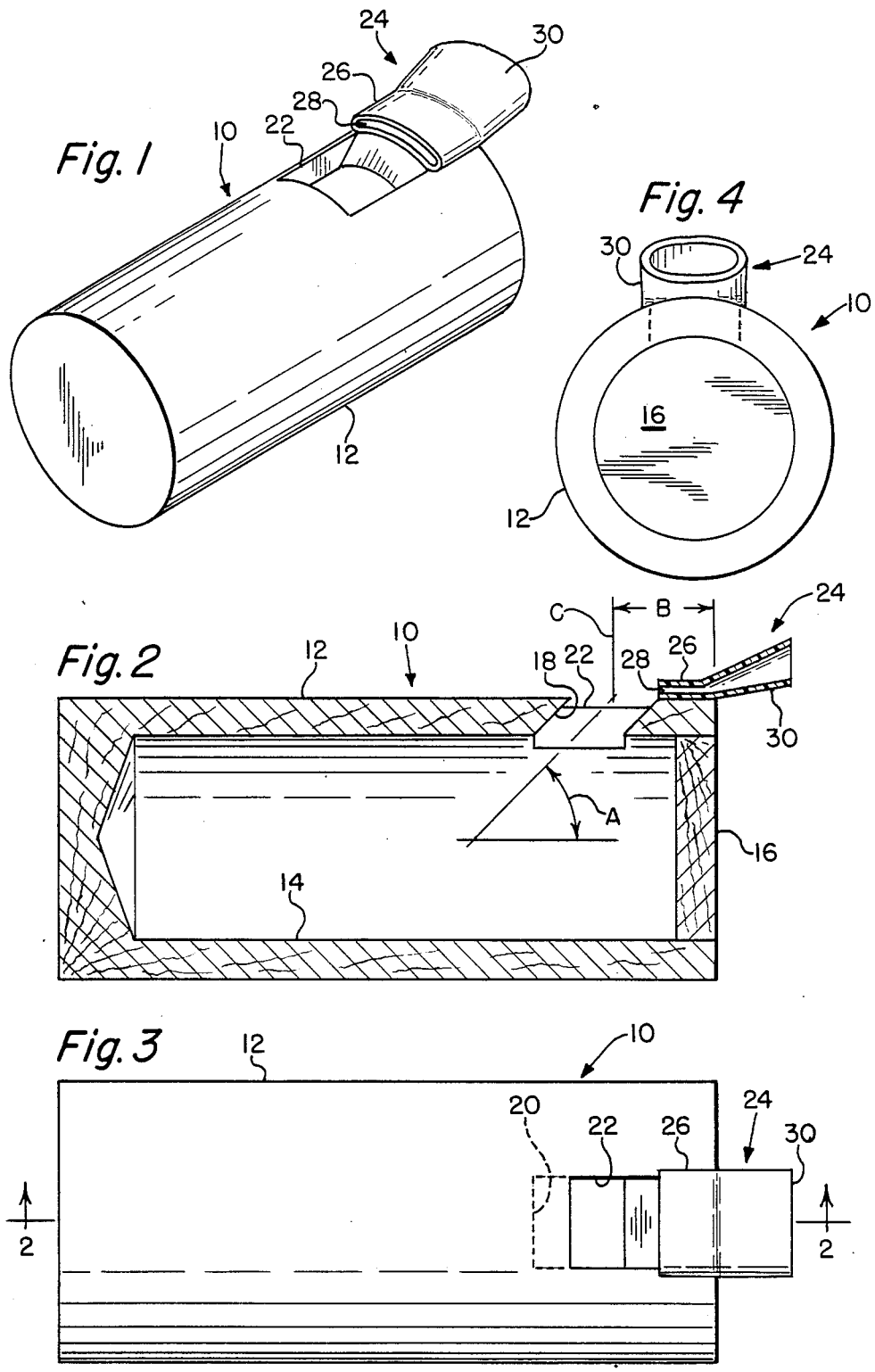

4,954,115

GAME CALL

Background of the Invention

This invention relates to a game call. More particularly, the invention relates to a game call that simulates an owl's cry and is effective in attracting wild turkeys.

It is known that wild turkeys respond to and are attracted by the sound made by an owl's cry. Accordingly, hunters desire to be able to simulate the cry of an owl and preferably over the longest possible distance to improve their chances for bagging a turkey. Currently available game calls which simulate an owl's cry are known to have a rather limited effective range beyond which the call merely sounds like a whistle which does not effectively attract turkeys.

Accordingly, there is a need for a game call which simulates an owls' cry and has an effective range for attracting animals, such as wild turkeys, greater than such calls presently available.

SUMMARY OF THE INVENTION

According to the invention, there is provided a game call that simulates an owl's cry including a hollow hardwood body forming a closed cylindrical chamber and a strategically sized, positioned and directionally orientated air passage into the chamber, whereby an owl's cry is simulated and carried over long distances when air is blown from a mouthpiece and directed across the inlet of the air passage.

According to an important aspect of the invention, the air passage is a passage through the wall of the call body inclined at an angle of about 45 degrees relative to the longitudinal axis of the chamber in a direction toward the flow of air directed across the inlet of the passage and having a square outlet into the chamber.

According to a preferred embodiment of the invention, the passage is a slot having a square inlet and a square outlet.

According to another important feature of the invention, there is provided means for directing the flow of air across the passage inlet substantially parallel to the plane of the passage inlet.

BRIEF DESCRIPTION OF THE DRAWINGS

The invention will be better understood after reading the following Detailed Description of the Preferred Embodiment in conjunction with the drawings of which:

FIG. 1 is a perspective view of a preferred embodiment of a game call according to the invention;

FIG. 2 is a vertical longitudinal cross sectional view taken along the line 2—2 in FIG. 1 showing details of construction;

FIG. 3 is a top view of a portion of the game call of FIG. 1 showing details of construction; and FIG. 4 is an end view toward the mouthpiece end of the game call showing further details of construction.

DETAILED DESCRIPTION OF THE PREFERRED EMBODIMENT

Shown in FIG. 1 is a game call 10 for simulating the cry of an owl. The game call in FIG. 1 is shown as having a cylindrical body 12 configuration, however, the invention is not limited to a cylindrical external shape. For example, the body 12 can also be square if desire.-.d The body 12 is a hardwood treated to resist moisture and includes a hollow interior forming an elongated cylindrical chamber 14 closed on opposite ends. Preferably, the body is made from a solid block of hardwood which is bored from one end to form the cylindrical chamber. The chamber is closed by a wood plug 16 sealed in the bore at the end of the block.

It has been found that the peculiar sound of an owl's cry is achievable by providing a passage 18 through the wall of the body proximate one end of the chamber which passage has at least a square outlet 20, as shown in FIG. 3, opening into the closed chamber 14 and which is also angled at an angle A of 45 degrees relative to the longitudinal axis of the chamber in a direction toward a flow of air which is directed across the inlet 22 of the passage, as shown by the arrow in FIG. 2. Preferably, the passage 18 is a slot having a square inlet 22 and a square outlet 20 angled 45 degrees in the direction as shown in FIGS. 2 and 3.

As shown in the drawings, an air flow tube 24 is mounted at the end of the body and includes a flow directing portion 26 that has a generally narrowed passage and outlet 28 but which outlet is preferably about the same width as and located in close proximity to the edge of the passage inlet 22. The tube 24 also includes a widened or enlarged mouthpiece 30 angled gently away from the body for receipt in an operator's mouth. The tube 24 can either be made entirely of plastic or alternatively of metal, such as copper, with a plastic lip guard if desired. In use, the operator blows air into the tube 24 which directs the flow of air across the inlet 22 in a direction substantially parallel to the longitudinal axis and external surface of the body and immediately adjacent to the plane of the inlet 22.

While the angle, direction and square shape of at least the outlet 20 of the passage 18 have been found to be especially important to achieving an effective simulation of the owl's cry, the range and effectiveness of the call have also been found to be optimized when the call body is made about 6 ½ inches in overall length with either a 2 ¾ inch outside diameter round body or 2 ¾ inch square body having a 2 inch diameter by about a 5 ¾ inch long chamber with the passage slot extending at the 45 degree angle between a ⅛ inch square inlet and a ⅛ inch square outlet where the center C of the inlet 22 is located at a distance B about 1 inch from the mouthpiece end of the body.

With minimal practice, using the game call according to the invention a hunter can perfect a call that simulates an owl's cry that is particularly effective in attracting wild turkeys at long ranges.

Having described the preferred embodiment of the invention, those skilled in the art having the benefit of that description can readily devise other embodiments and modification and those other embodiments and modifications are to be considered to be within the scope of the appended claims.

What is claimed is:

1. A game call comprising:
    a hardwood body including an internal chamber closed on opposite ends and a passage through a wall of said body angled at 45 degrees relative to the longitudinal axis of the chamber in a direction toward a flow of air directed across an inlet of said passage, said passage having a square outlet into said chamber; and
    means on said body for directing the flow of air across said inlet.

2. The game call as defined in claim 1 wherein said body is elongated and said chamber is an elongated cylindrical chamber, said inlet into said passage is located proximate one end of said body.

3. The game call as defined in claim 2 wherein said passage is a slot having a square inlet and a square outlet and said means for directing the flow of air includes a member on said body including a flow directing passage having an outlet dispose adjacent said inlet to said passage.

4. The game call as defined in claim 3 wherein said chamber has a diameter of about 2 inches and said outlet and said inlet of said passage are each about ⅛ inches square.

5. A game call comprising:
an elongated hollow body defining a cylindrical internal chamber extending between closed ends of said body, said body including a passage in a wall of said body extending between an inlet to said passage located on an external peripherial surface of said body and a square outlet of said passage into said chamber, said passage angled about 45 degrees relative to the longitudinal axis of said chamber in a direction toward a flow of air directed across said inlet from a location proximate one of said closed ends; and
means proximate said one closed end for directing the flow of air across said inlet of said passage, said means for directing the flow of air adapted to direct the flow of air across said inlet in a direction substantially parallel to a plane of said inlet.

6. The game call as defined in claim 5 wherein said inlet is square and said passage is a slot extending between said square inlet and square outlet.

7. The game call as defined in claim 6 wherein said body is a hardwood.

8. A game call comprising:
a generally enlongated hollow hardwood body including an elongated cylindrical chamber closed on opposite ends, and a passage in a wall of said body angled at about 45 degrees relative to the longitudinal axis of said chamber extending between an inlet on an outer surface of said body and a square outlet into said chamber in a direction toward a flow of air directed across said inlet; and
means for directing the flow of air across said inlet in a direction substantially parallel with said outer surface and the longitudinal axis of the chamber.

9. The game call as defined in claim 8 wherein said means for directing the flow of air includes a tube-like member mounted to said body proximate one of said ends including a mouthpiece and an air flow directing portion, said air flow directing portion opening at a location proximate said inlet;

10. The game call as defined in claim 9 wherein said inlet and said outlet are each about ⅛ inch square, said chamber is about 5 ¾ inches long and about 2 inches in diameter and the center of said inlet is located about 1 inch from said one of said closed ends.

* * * * *